US012722505B2

(12) United States Patent
Katsuya

(10) Patent No.: US 12,722,505 B2
(45) Date of Patent: Sep. 1, 2026

(54) CONTACTLESS POWER TRANSMISSION SYSTEM

(71) Applicant: HONDA MOTOR CO., LTD., Tokyo (JP)

(72) Inventor: Jin Katsuya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/892,935

(22) Filed: Sep. 23, 2024

(65) Prior Publication Data

US 2025/0115142 A1 Apr. 10, 2025

(30) Foreign Application Priority Data

Oct. 5, 2023 (JP) ................................ 2023-173622

(51) Int. Cl.
*B60L 53/122* (2019.01)
*B60L 53/62* (2019.01)

(52) U.S. Cl.
CPC ............ *B60L 53/122* (2019.02); *B60L 53/62* (2019.02); *B60L 2210/40* (2013.01)

(58) Field of Classification Search
CPC .... B60L 53/122; B60L 53/62; B60L 2210/40; B60L 53/39
See application file for complete search history.

(56) References Cited

U.S. PATENT DOCUMENTS

2017/0106767 A1 4/2017 Tajima et al.
2021/0143680 A1 5/2021 Nakanishi et al.
2023/0387724 A1* 11/2023 Cheon .................... H02J 7/342
2024/0079907 A1 3/2024 Nagaoka
2025/0096614 A1* 3/2025 Ramakrishnan ........ H02J 50/80

FOREIGN PATENT DOCUMENTS

| | | |
|---|---|---|
| JP | 2015-136274 | 7/2015 |
| JP | 7332025 | 8/2023 |
| WO | 2015/146388 | 10/2015 |
| WO | 2020/049853 | 3/2020 |

OTHER PUBLICATIONS

Japanese Office Action for Japanese Patent Application No. 2023-173622 mailed Apr. 15, 2025.

* cited by examiner

*Primary Examiner* — Daniel Cavallari
(74) *Attorney, Agent, or Firm* — Amin, Turocy & Watson, LLP

(57) ABSTRACT

A contactless power transmission system includes a power transmitting unit, a power transmission power conversion unit, and a power transmission side control device. The power transmitting unit has a primary coil for sending out AC power to be transmitted to a power receiving device in a non-contact manner. The power transmission power conversion unit has a plurality of transistors connected to the primary coil. The power transmission power conversion unit converts a DC power supplied from a power source unit to an AC power. The power transmission side control device sets transmission power at a start period of initial power transmission by the power transmitting unit to less than a predetermined power. The power transmission side control device changes the transmission power in a tendency of increasing toward a predetermined power as a time elapses from a start of power transmission by the power transmitting unit.

3 Claims, 10 Drawing Sheets

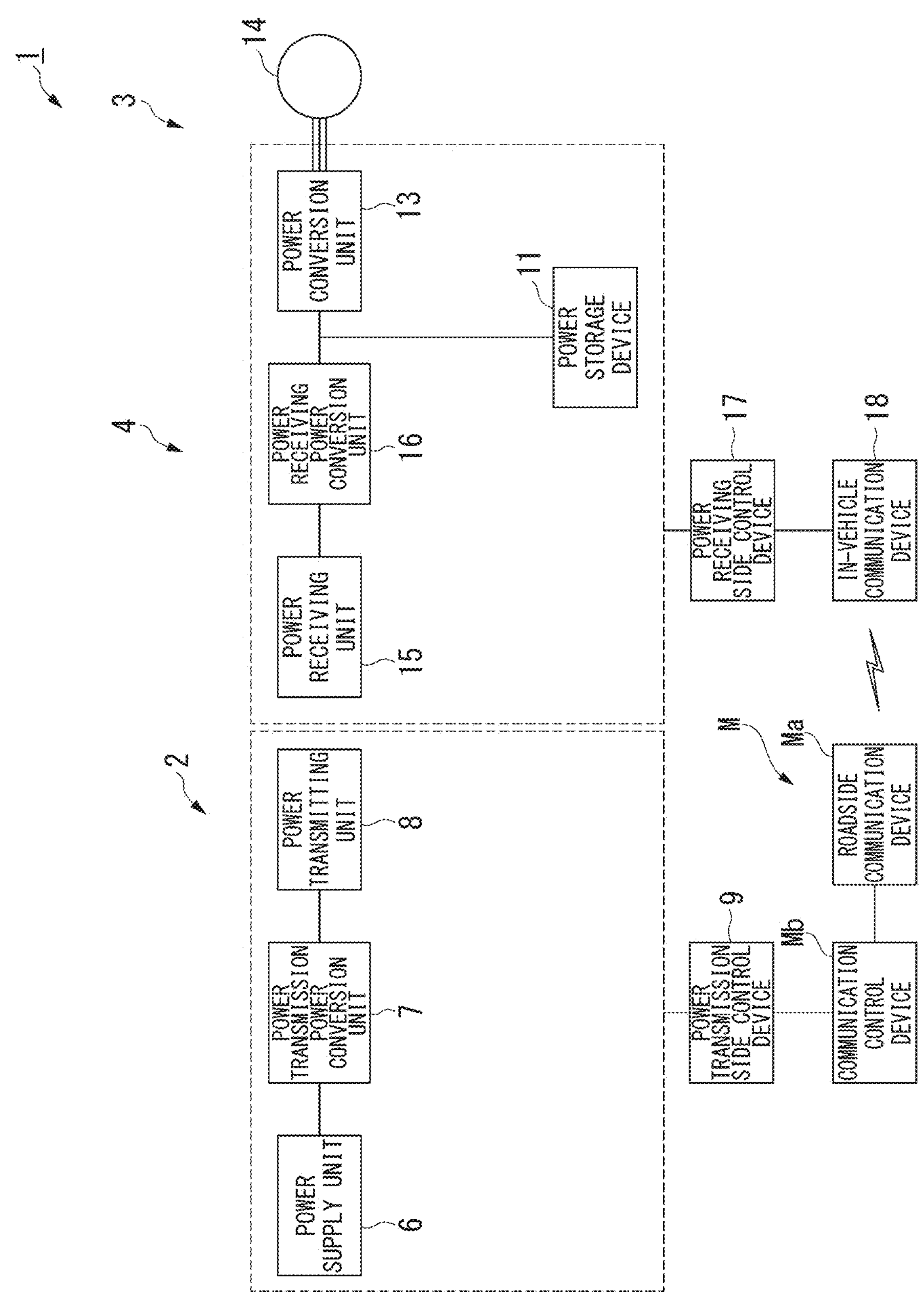
FIG. 1
1
3
14
POWER CONVERSION UNIT
13
11
POWER STORAGE DEVICE
4
POWER RECEIVING POWER CONVERSION UNIT
16
POWER RECEIVING UNIT
15
17
POWER RECEIVING SIDE CONTROL DEVICE
18
IN-VEHICLE COMMUNICATION DEVICE
2
POWER TRANSMITTING UNIT
8
M
Ma
ROADSIDE COMMUNICATION DEVICE
POWER TRANSMISSION POWER CONVERSION UNIT
7
9
POWER TRANSMISSION SIDE CONTROL DEVICE
Mb
COMMUNICATION CONTROL DEVICE
POWER SUPPLY UNIT
6

CONTACTLESS POWER TRANSMISSION SYSTEM

CROSS-REFERENCE TO RELATED APPLICATION

Priority is claimed on Japanese Patent Application No. 2023-173622, filed Oct. 5, 2023, the content of which is incorporated herein by reference.

BACKGROUND OF THE INVENTION

Field of the Invention

The present invention relates to a contactless power transmission system.

Description of Related Art

In recent years, research and development has been conducted on charging and supplying power to a vehicle equipped with a secondary battery, which contributes to energy efficiency to ensure that more people have access to affordable, reliable, sustainable, and advanced energy.

Conventionally, in a contactless power transmission system that supplies power from a power transmitting side to a power receiving side by power transmission in a non-contact manner, a system is known in which a supply power according to a required power at the power receiving side is transmitted from the power transmitting side to the power receiving side based on information transmitted from the power receiving side to the power transmitting side (for example, refer to Patent Documents 1 and 2 listed below).

[Patent Document 1] Japanese Unexamined Patent Application, First Publication No. 2015-136274

[Patent Document 2] PCT International Publication No. WO2020/049853

SUMMARY OF THE INVENTION

In a technology related to charging and supplying power to a vehicle equipped with a secondary battery, it is desirable to suppress occurrence of problems that accompany a start of power transmission when a coil on the power receiving side of the vehicle approaches a coil on the power transmitting side in power transmission in a non-contact manner to a traveling vehicle. For example, a current increase accompanying a rapid start of power supply may cause problems such as an increase in load due to a drop in frequency in the power supply system on the power transmitting side, or a power supply stop due to overcurrent detection caused by current hunting.

Aspects of the present invention have been made in consideration of such circumstances, and aim to provide a contactless power transmission system that can suppress occurrence of problems at a start of power transmission and can maintain appropriate power transmission. This will ultimately contribute to energy efficiency.

To solve the problems described above and achieve the above object, the present invention has adopted the following aspects.

(1): A contactless power transmission system according to one aspect of the present invention includes a power transmitting unit that has a coil for sending out AC power to be transmitted to a power receiving device in a non-contact manner, a power conversion unit that has a plurality of switching elements connected to the coil, and converts DC power supplied from a power source to the AC power, and a control device configured to control a switching operation of the plurality of switching elements, in which the control device sets transmission power at a beginning of power transmission by the power transmitting unit to less than a predetermined power, and changes the transmission power in a tendency of increasing toward the predetermined power as a time elapses from the beginning of power transmission by the power transmitting unit.

(2): In the aspect of (1) described above, the control device may set an initial power transmission start period to a predetermined period of time from a start of power transmission, and the predetermined period of time may be set on the basis of at least one of a supply capacity of the power source, the number of the power transmitting units connected to the power source, and a moving speed of the power receiving device with respect to the power transmitting units.

(3): In the aspect of (1) or (2) described above, the control device may control the transmission power according to a duty ratio or a phase shift amount of a signal instructing the switching operation.

(4): In the aspect of (3) described above, the contactless power transmission system further includes a current sensor configured to detect a current of the DC power, in which the control device may set the predetermined power as a required power of the power receiving device, and change the transmission power in a tendency of decreasing toward the predetermined power on the basis of a detection value of the current output from the current sensor when the transmission power is greater than the predetermined power.

According to the aspect (1) described above, by providing a control device that sets the transmission power of the initial power transmission start period to less than the predetermined power, it is possible to suppress an increase in current that accompanies a rapid start of power supply. The control device changes the transmission power in a tendency of increasing toward the predetermined power as a time elapses from the start of power transmission, so that an increase in a load on the power source and occurrence of an overcurrent can be suppressed. For example, it is possible to suppress occurrence of problems such as an increase in load due to a drop in frequency in the power supply system on a power transmitting side and a power supply stop due to overcurrent detection caused by current hunting.

In the case of the aspect (2) described above, the control device sets the initial power transmission start period on the basis of at least one of a supply capacity of a power source, the number of power transmitting units connected to the power source, and a moving speed of the power receiving device with respect to the power transmitting units, so that it is possible to appropriately reduce the transmission power.

In the case of the aspect (3) described above, the control device controls the transmission power according to the duty ratio or phase shift amount, so that it is possible to quickly control the transmission power even when the power receiving device moves with respect to the power transmitting unit.

In the case of the aspect (4) described above, the control device controls the transmission power on the basis of a detection value of a current even after the initial power transmission start period has elapsed, so that it is possible to set an appropriate transmission power even when power transmission is sequentially performed on, for example, a plurality of moving bodies, such as vehicles, with different required powers.

BRIEF DESCRIPTION OF THE DRAWINGS

FIG. 1 is a diagram which shows a configuration of a contactless power transmission system according to an embodiment of the present invention.

DETAILED DESCRIPTION OF THE INVENTION

A contactless power transmission system according to an embodiment of the present invention will be described below with reference to the attached drawings.

Figure 2:
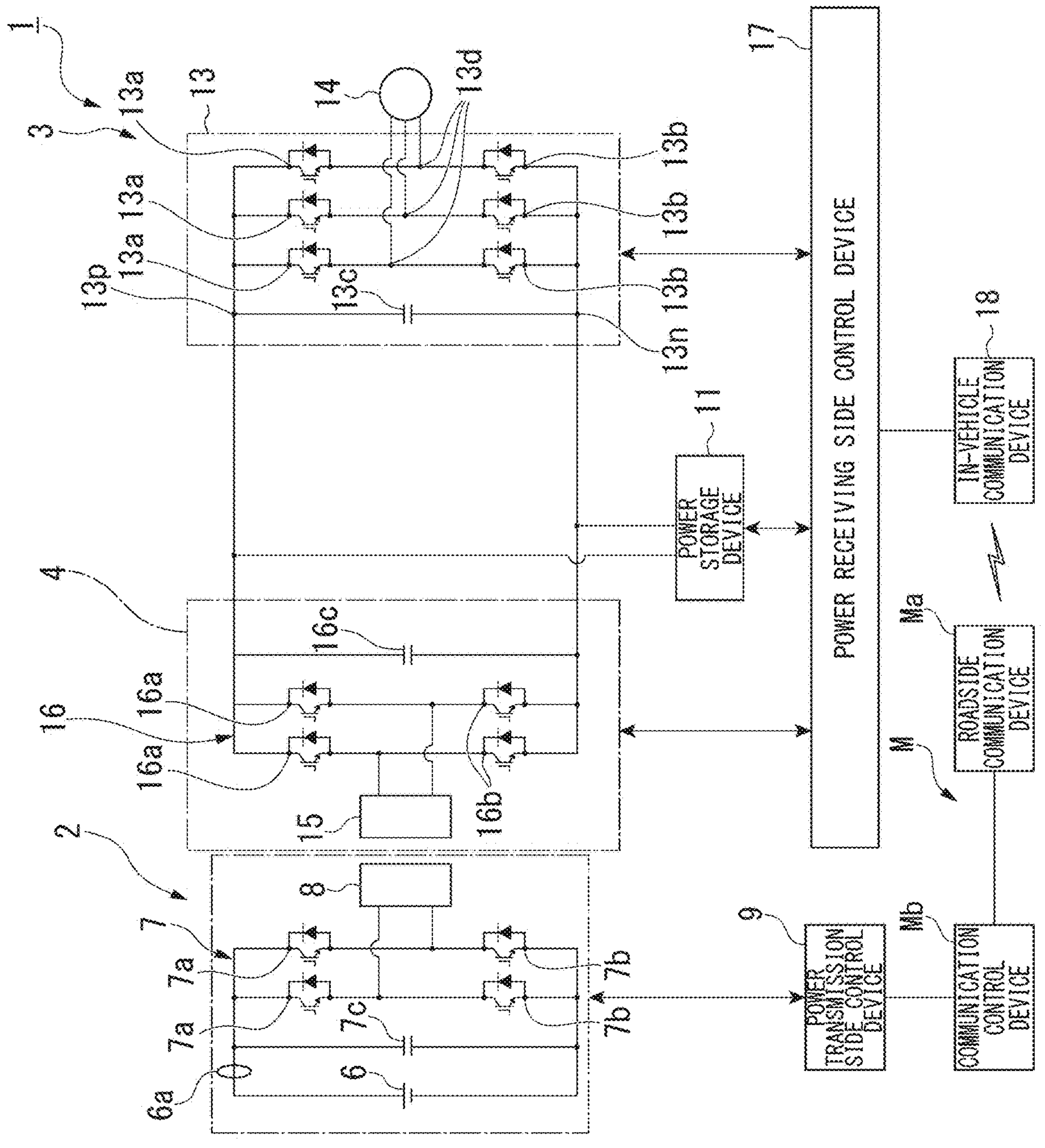
FIG. 2 is a diagram which shows details of the configuration of the contactless power transmission system according to the embodiment of the present invention.
Figure 3:
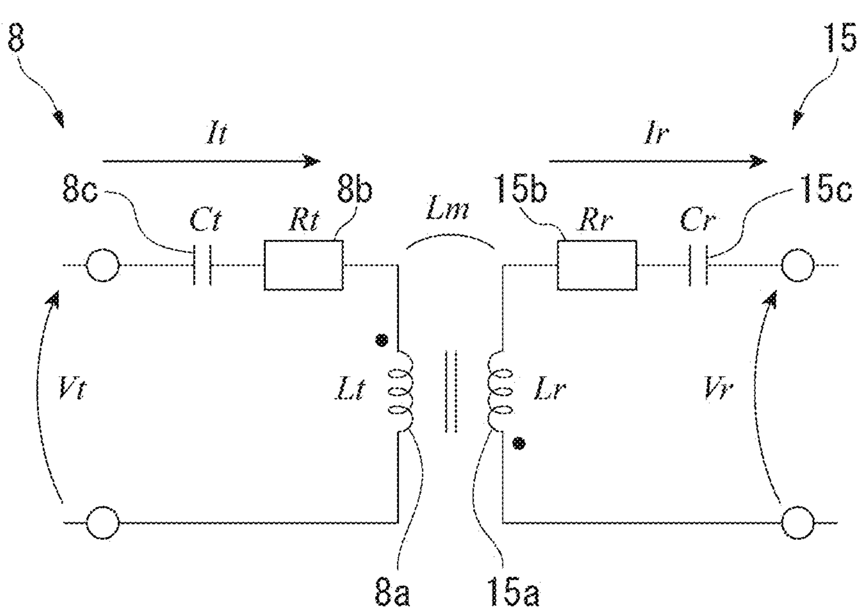
FIG. 3 is a diagram which shows configurations of a power transmitting unit and a power receiving unit of the contactless power transmission system according to the embodiment of the present invention.

FIGS. 1 and 2 are diagrams which show a configuration of a contactless power transmission system 1 according to an embodiment. FIG. 3 is a diagram which shows configurations of a power transmitting unit 8 and a power receiving unit 15 of the contactless power transmission system 1 according to the embodiment.

The contactless power transmission system 1 according to the embodiment supplies power from outside a moving body such as a vehicle to the moving body by, for example, contactless power transmission. The vehicle is, for example, an electric motor vehicle such as an electric vehicle, a hybrid vehicle, or a fuel cell vehicle.

(Contactless Power Transmission System)

As shown in FIGS. 1 and 2, the contactless power transmission system 1 of the embodiment includes, for example, a power transmitting device 2 installed on a traveling road of a vehicle, a drive control device 3 and a power receiving device 4 mounted on a moving body such as a vehicle, and a communication system M. The contactless power transmission system 1 of the embodiment may include at least only components outside the moving body (for example, the power transmitting device 2 and the communication system M), or power transmission may be performed in a non-contact manner by combining components mounted on the moving body (for example, the drive control device 3 and the power receiving device 4) with the contactless power transmission system 1 outside the moving body.

The communication system M includes, for example, at least one roadside communication device Ma and a communication control device Mb. The communication system M constitutes at least a part of a system for electronically collecting tolls, such as an electronic toll collection system (ETC) on a toll road.

The roadside communication device Ma is disposed at, for example, a predetermined distance on an upstream side of a coupling section (a communication section and a power transmission section), which will be described below, on the traveling road of a vehicle. The roadside communication device Ma is equipped with an antenna for wireless communication and communicates wirelessly with an in-vehicle communication device 18 to be described below that is mounted on a moving body such as a vehicle. For example, when the roadside communication device Ma acquires from the in-vehicle communication device 18 information required for billing and settlement for power transmission from the power transmitting device 2 to a moving body such as a vehicle, it transmits key information required to start the power transmission and information regarding an installation of the power transmitting device 2 to the in-vehicle communication device 18. The information required for billing and settlement is information specific to a moving body such as a vehicle, such as presence or absence and an identifier of an IC card or on-board transponder for toll collection. The key information is, for example, information that is generated while being updated at a predetermined cycle so that it is different for each authorized moving body (that is, a vehicle or the like for which execution of power transmission is permitted) passing through a predetermined power transmission section. The key information is information required for the power transmitting device 2 to authenticate the power receiving device 4 of a moving body such as a vehicle, which will be described below. Information regarding an installation of the power transmitting device 2 is, for example, information such as an installation interval of a plurality of power transmitting units 8, which will be described below.

The communication control device Mb controls an operation of all roadside communication devices Ma that are associated with it in advance. The communication control device Mb is a software functional unit that functions when a processor such as a central processing unit (CPU) executes a predetermined program. The software functional unit is an ECU equipped with electronic circuits such as a processor such as a CPU, a read only memory (ROM) that stores a program, a random access memory (RAM) that temporarily stores data, and a timer. At least a part of the communication control device Mb may be an integrated circuit such as a large scale integration (LSI).

For example, the communication control device Mb attempts to acquire the information required for billing and settlement by communicating with the roadside communication device Ma and the in-vehicle communication device 18 of a moving body such as a nearby vehicle at a predetermined cycle. When the communication control device Mb acquires the information required for billing and settlement from the in-vehicle communication device 18 and confirms that electronic settlement is possible, it transmits permission information indicating that electronic settlement is possible and key information required for starting power transmission to the in-vehicle communication device 18. When the key information is transmitted from the roadside communication device Ma to the in-vehicle communication device 18, the communication control device Mb transmits the same key information to the power transmission side control device 9, which will be described below.

The power transmitting device 2 includes, for example, a power supply unit 6, a power transmission power conversion unit 7, a power transmitting unit 8, and a power transmission side control device 9. The power transmitting device 2 may include, for example, at least a plurality of power transmitting units 8 at predetermined coupling sections on a road on which the vehicle is traveling.

The power supply unit 6 includes, for example, an AC power source such as a commercial power source, an AC to DC converter that converts AC power into DC power, and a capacitor for smoothing power. The power supply unit 6 converts AC power supplied from the AC power source into DC power using the AC to DC converter. The power supply unit 6 includes, for example, a current sensor 6*a* that detects a current of the DC power.

The power transmission power conversion unit 7 includes, for example, an inverter that converts DC power into AC power. The inverter of the power transmission power conversion unit 7 includes, for example, a first bridge circuit formed by a plurality of switching elements and rectifier elements that are bridge-connected in two phases, and a capacitor for voltage smoothing. Each switching element is, for example, a transistor such as a silicon carbide (SiC) metal oxide semiconductor field effect transistor (MOSFET). The plurality of switching elements are high-side arm and low-side arm transistors 7*a* and 7*b* that form a pair in each phase. The rectifier elements are, for example, freewheel diodes connected in parallel to each of the transistors 7*a* and 7*b*. The capacitor for voltage smoothing 7*c* is connected in parallel to the first bridge circuit.

The power transmitting unit 8 transmits power by changing a high-frequency magnetic field, for example, through magnetic field coupling, such as magnetic field resonance or electromagnetic induction. As shown in FIG. 3, the power transmitting unit 8 includes a resonant circuit formed by, for example, a primary coil 8*a*, a primary resistor 8*b*, and a primary capacitor 8*c* connected in series. The power transmitting unit 8 includes a sensor, such as a current sensor, that detects a current (a power transmitting side current) It that flows through a resonant circuit.

The power transmission side control device 9 performs integrated control of the power transmitting device 2. The power transmission side control device 9 is a software functional unit that functions when a processor, such as a central processing unit (CPU) executes a specified program. The software functional unit is an ECU that includes a processor such as a CPU, a read only memory (ROM) that stores a program, a random access memory (RAM) that temporarily stores data, and an electronic circuit such as a timer. At least a part of the power transmission side control device 9 may be an integrated circuit such as a large scale integration (LSI).

The power transmission side control device 9 generates, for example, a control signal indicating a timing for driving each switching element on (conducting) and off (blocking), and generates a gate signal for actually driving each switching element on and off on the basis of the control signal.

For example, the power transmission side control device 9 transmits power to the power receiving device 4 of a moving body such as a vehicle by controlling on (conducting) and off (blocking) switching of each switching element of the power transmission power conversion unit 7 in accordance with information on a preset drive frequency or information on a requested frequency received from the power receiving device 4.

For example, when the power transmission side control device 9 receives key information from the communication control device Mb, it ascertains that the same key information has been transmitted from the roadside communication device Ma to the in-vehicle communication device 18 of the moving body, and transitions the power transmitting device 2 from a stopped state to a reception standby state. The stopped state of the power transmitting device 2 is a state in which the switching operation of the power transmission power conversion unit 7 is stopped, for example, by maintaining each switching element of the power transmission power conversion unit 7 off (blocking). The reception standby state of the power transmitting device 2 is a state in which transmission of information from the power receiving device 4 of the moving body such as a vehicle or the like is detected. The reception standby state of the power transmitting device 2 is, for example, a short-circuit state of the power transmission power conversion unit 7.

When the power transmission power conversion unit 7 is in a short-circuit state, the power transmission side control device 9 short-circuits the primary coil 8*a* by setting a low-side arm transistor 7*b* of each phase to an on state. As a result, when the power transmitting device 2 on a primary side is viewed from the power receiving device 4 on a secondary side, an impedance on the primary side becomes a very large value, but when a magnetic field is generated by a secondary coil 15*a* of the power receiving device 4 during a PING transmission, which will be described below, communication from the power receiving device 4 is detected by a voltage induced in the primary coil 8*a* of the power transmitting device 2.

For example, when the power transmission side control device 9 receives key information and information on a requested frequency of power transmission from the power receiving device 4, it performs collation of the key information received from the communication control device Mb with the key information received from the power receiving device 4. When the key information matches, the power transmission side control device 9 transitions the power transmitting device 2 from a reception standby state to a power transmission state. The power transmitting state of the power transmitting device 2 is, for example, a state in which power is transmitted at a frequency requested by the power receiving device 4.

Details of the power transmission control by the power transmission side control device 9 will be described below.

As shown in FIGS. 1 and 2, the drive control device 3 of a moving body such as a vehicle includes, for example, a power storage device 11, a power conversion unit 13, and a rotation electric machine 14. The power receiving device 4 of the moving body includes, for example, a power receiving unit 15 and a power receiving power conversion unit 16. The drive control device 3 and the power receiving device 4 include, for example, a common power receiving side control device 17. The power receiving side control device 17 includes, for example, an in-vehicle communication device 18.

The power storage device 11 is connected to the power conversion unit 13 and the power receiving power conversion unit 16, which will be described below. The power storage device 11 is charged by power transmitted in a non-contact manner from the power transmitting device 2 outside the moving body such as a vehicle. The power storage device 11 transmits or receives power to or from the rotation electric machine 14 via a power conversion unit 13.

The power storage device 11 includes a battery such as a lithium-ion battery, a current sensor that detects a current of the battery, and a voltage sensor that detects a voltage of the battery.

The power conversion unit 13 is connected to the rotation electric machine 14. The power conversion unit 13 includes, for example, a power converter that converts DC power to AC power. The power converter includes, for example, a second element module and a capacitor for voltage smoothing.

The second element module includes, for example, a second bridge circuit formed by a plurality of switching elements and rectifier elements that are bridge-connected in three phases. Each switching element is, for example, a transistor such as a SiC MOSFET. The plurality of switching elements are high-side arm and low-side arm transistors 13*a* and 13*b* that form a pair in each phase. The rectifying elements are, for example, freewheeling diodes connected in parallel to each of the transistors 13*a* and 13*b*. The capacitor for voltage smoothing 13*c* is connected in parallel to the second bridge circuit.

The second element module controls an operation of the rotation electric machine 14 by transmitting and receiving power. For example, when the rotation electric machine 14 is powered, the second element module converts DC power input from positive and negative DC terminals 13*p* and 13*n* into three-phase AC power and supplies the three-phase AC power from a three-phase AC terminal 13*d* to a rotation electric machine 14. The second element module generates a rotational driving force by sequentially commutating a current to a three-phase stator winding of the rotation electric machine 14.

For example, during regeneration of the rotation electric machine 14, the second element module converts the three-phase AC power input from the three-phase stator winding into DC power by driving a switching element of each phase synchronized with a rotation of the rotation electric machine 14 to an on state (conduction) and an off state (blocking). The second element module is capable of supplying the DC power into which the three-phase AC power is converted to the power storage device 11.

The rotation electric machine 14 is, for example, a three-phase AC brushless DC motor provided for driving the moving body such as a vehicle. The rotation electric machine 14 includes a rotor having a permanent magnet for a field, and a rotor having a three-phase stator winding that generates a rotating magnetic field that rotates the rotor. The three-phase stator winding is connected to a three-phase AC terminal 13*d* of the power conversion unit 13.

The rotation electric machine 14 generates a rotational driving force by performing a powering operation using power supplied from the power conversion unit 13. When the rotation electric machine 14 can be connected to, for example, wheels of a vehicle, it generates a traveling drive force by performing the powering operation using the power supplied from the power conversion unit 13. The rotation electric machine 14 may generate electric power by performing a regenerative operation using a rotational power input from the wheels of the vehicle. When the rotation electric machine 14 can be connected to an internal combustion engine of the vehicle, it may generate electric power using a power of the internal combustion engine.

The power receiving unit 15 is connected to the power receiving power conversion unit 16. The power receiving unit 15 receives power by changes in a high-frequency magnetic field transmitted from the power transmitting unit 8 by, for example, magnetic field coupling such as magnetic field resonance or electromagnetic induction. As shown in FIG. 3, the power receiving unit 15 includes, for example, a resonant circuit formed by a secondary coil 15*a*, a secondary resistor 15*b*, and a secondary capacitor 15*c* connected in series. The power receiving unit 15 includes, for example, a sensor such as a current sensor that detects a current (a power receiving side current) Ir flowing through the resonant circuit.

The power receiving power conversion unit 16 shown in FIG. 1 and FIG. 2 is connected to the power conversion unit 13. The power receiving power conversion unit 16 includes a so-called full bridgeless type (or a bridgeless and totem pole type) power factor correction (PFC) circuit that converts AC power to DC power. A so-called bridgeless PFC is a PFC that does not have a bridge rectifier made of a plurality of bridge-connected diodes, and a so-called totem-pole PFC is a PFC that has a pair of switching elements of the same conductivity type connected in series in the same direction (totem-pole connection).

The power receiving power conversion unit 16 includes, for example, a third bridge circuit formed by a plurality of switching elements and rectifier elements that are bridge-connected in two phases, and a capacitor for voltage smoothing. Each switching element is, for example, a transistor such as a SiC MOSFET. The plurality of switching elements are high-side arm and low-side arm transistors 16*a* and 16*b* that form a pair in each phase. The rectifier elements are, for example, freewheel diodes connected in parallel to each of the transistors 16*a* and 16*b*. The capacitor for voltage smoothing 16*c* is connected in parallel to a third bridge circuit.

For example, the power receiving device 4, which is equipped with a power receiving unit 15 and a power receiving power conversion unit 16, receives power transmitted from the power transmitting device 2 by controlling the on (conduction) and off (blocking) switching of each switching element of the power receiving power conversion unit 16 according to information on a frequency of power transmission by the power transmitting device 2.

The power receiving side control device 17, for example, performs integrated control of the drive control device 3, the power receiving device 4, and the in-vehicle communication device 18 of the moving body such as a vehicle. The power receiving side control device 17 is a software functional unit that functions when a processor such as a central processing unit (CPU) executes a predetermined program. The software functional unit is an ECU that includes a processor such as a CPU, a read only memory (ROM) that stores a program, a random access memory (RAM) that temporarily stores data, and an electronic circuit such as a timer. At least a part of the power receiving side control device 17 may be an integrated circuit such as a large scale integration (LSI).

The power receiving side control device 17 generates, for example, a control signal indicating a timing for driving each switching element on (conducting) and off (blocking), and generates a gate signal for actually driving each switching element on and off on the basis of the control signal.

For example, the power receiving side control device 17 controls switching of each switching element of the power receiving device 4, thereby rectifying AC power received from the power transmitting device 2 to DC power while performing the power factor correction of an input voltage and an input current. For example, the power receiving side control device 17 controls an output according to a target output by a synchronous rectification operation that synchronously drives the plurality of switching elements of the power receiving device 4 on and off, and a short-circuit operation that short-circuits the secondary coil 15*a*.

For example, the power receiving side control device 17 controls the synchronous rectification operation according to a current generated in the power receiving unit 15 by the power transmitted from the power transmitting device 2, that is, a magnitude and a phase of a current Ir flowing through the secondary coil 15*a*. The power receiving side control device 17 controls the plurality of switching elements of the power receiving power conversion unit 16 by a soft switching of a so-called zero voltage switching (ZVS). In zero voltage switching (ZVS), each switching element is turned on (switched from the off state to the on state) after a voltage across both ends is made zero by discharging an output capacitance (parasitic capacitance) in the off state during a dead time period of each phase.

For example, the power receiving side control device 17 controls the short-circuit operation by turning on only the low-side arm of each phase while continuing the synchronous rectification operation of zero voltage switching (ZVS) with the high-side arm of each phase of the power receiving power conversion unit 16. The power receiving side control device 17 increases the impedance on the secondary side when the secondary side power receiving device 4 is viewed from the power transmitting device 2 on the primary side by short-circuiting the secondary coil 15*a*, thereby reducing a current on the primary side (power transmitting current: current It flowing through the primary coil 8*a*). The power receiving side control device 17 controls the current of the power transmitting device 2 on the primary side by the power receiving device 4 on the secondary side, thereby executing independent power control such as stopping power transmission on the power receiving device 4 side.

For example, the power receiving side control device 17 sets a communication section for communication and a power transmission section for power transmission in a coupling section near the power transmitting device 2 where a degree of coupling between the primary coil 8*a* of the power transmitting device 2 and the secondary coil 15*a* of the power receiving device 4 is equal to or greater than a predetermined value. For example, when the power receiving side control device 17 receives key information through communication between the roadside communication device Ma and the in-vehicle communication device 18 before reaching the coupling section, it transmits information on the power transmission in the power transmission section from the power receiving device 4 to the power transmitting device 2 in the communication section before the power transmitting device 2 starts transmitting power in the power transmission section.

For example, when a first communication section and a second communication section are set before and after the power transmission section in a movement direction of the moving body (for example, a vehicle V), the power receiving side control device 17 transmits information on the power transmission from the power receiving device 4 to the power transmitting device 2 in the first communication section, which is the first communication section.

The information on the power transmission is, for example, key information acquired from roadside communication device Ma, a required power and a required frequency of the power transmission, a target output (power consumption) for fail-safe purposes, information on various abnormalities, and the like.

The required power of the power transmission is a target value of the power that the power receiving device 4 receives from the power transmitting device 2, and is set, for example, according to a target drive force of the moving body or the rotation electric machine 14, a power consumption of various auxiliary devices connected to the power storage device 11, a remaining capacity (SOC: State of Charge) of the power storage device 11, and the like.

The required frequency of the power transmission is a frequency required for the power transmission of the power transmitting device 2, and is set according to the required power. The required frequency is set, for example, on the basis of a minimum ground clearance of the moving body related to a distance between the primary coil 8*a* and the secondary coil 15*a* and a mounting layout of the power receiving device 4 on the moving body, to suppress a decrease in the efficiency of the power transmission and the output (electricity). The required frequency may be set according to, for example, a state of the power transmission between the power transmitting device 2 and the power receiving device 4.

For example, when the primary coil 8*a* is present in a last communication section of the coupling section (for example, the second communication section, or the like), the power receiving side control device 17 may transmit information indicating a stop of each of power transmission in the power transmission section and communication in the communication section from the power receiving device 4 to the power transmitting device 2 through communication between the power transmitting device 2 and the power receiving device 4.

For example, when the power receiving side control device 17 receives key information through communication between the roadside communication device Ma and the in-vehicle communication device 18, it transmits information by transmitting power from the power receiving device 4 to the power transmitting device 2 in a reception standby state as transmission of a so-called PING signal in the communication section of the coupling section. The power receiving device 4 communicates by a voltage induced in the primary coil 8*a* of the power transmitting device 2 by a magnetic field generated in the secondary coil 15*a* by a current switching operation by switching in the power receiving power conversion unit 16. The power receiving side control device 17 executes PING transmission by, for example, generating a two-level, so-called dominant and recessive, digital signal by switching a carrier wave for transmitting power in a non-contact manner from the power receiving device 4 to the power transmitting device 2 at a predetermined duty ratio. The predetermined duty ratio is, for example, about 50% from a predetermined minimum. The power receiving side control device 17 may transmit information according to, for example, amplitude modulation of the carrier wave by changing the duty ratio of the switching.

The power receiving side control device 17 performs PING transmission at a predetermined cycle, for example, every tens of μs to several ms, and when it receives a response signal to the PING transmission from the power transmitting device 2, it starts power receiving control of the power transmission from the power transmitting device 2 in the power transmission section.

The power receiving side control device 17 sets a timing of the PING transmission in accordance with, for example, information on an installation of the power transmitting device 2 received from the roadside communication device Ma and a moving state of the moving body (for example, the vehicle V) (that is, the moving state of the power receiving device 4) so that communication between power transmitting device 2 and power receiving device 4 in the communication section (that is, mutual transmission and reception) is appropriately completed. For example, the power receiving side control device 17 sets the transmission cycle according to information on an installation interval and the like of the plurality of power transmitting units 8 and a speed of the moving body (for example, a vehicle speed of the vehicle V) so that PING transmission is completed at least a predetermined number of times (such as once) in the communication section.

Note that, for example, even if the power receiving side control device 17 permits execution of PING transmission in the communication section, it transitions to a standby state in which the execution of PING transmission is stopped outside the communication section. For example, in the standby state for PING transmission, the power receiving side control device 17 may start the execution of PING transmission immediately before reaching a first communication section of a next coupling section as the moving body moves.

Hereinafter, the processing executed by the power transmission side control device 9 and the power receiving side control device 17 as an operation of the contactless power transmission system 1 will be described.

Figure 4:
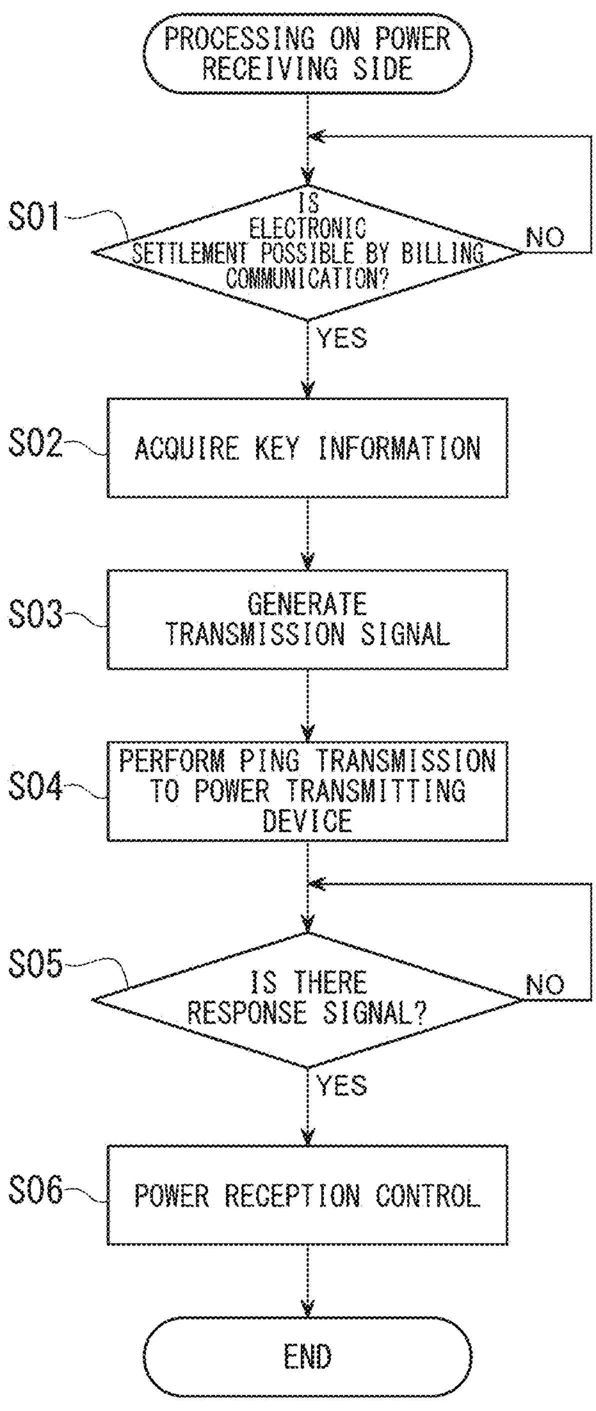
FIG. 4 is a flowchart which shows processing on a power receiving side of the contactless power transmission system according to the embodiment of the present invention.

FIG. 4 is a flowchart which shows power receiving side processing executed by the power receiving side control device 17 of the contactless power transmission system 1 in the embodiment.

First, in step S01 shown in FIG. 4, the power receiving side control device 17 determines whether electronic settlement for the power transmission from the power transmitting device 2 to the moving body is possible by transmitting and receiving information (billing communication) by wireless communication between the roadside communication device Ma and the in-vehicle communication device 18. When a result of the determination is "NO," the power receiving side control device 17 repeats processing of step S01. On the other hand, when a result of the determination is "YES," the power receiving side control device 17 advances the processing to step S02.

Then, in step S02, the power receiving side control device 17 acquires key information required to start the power transmission from the roadside communication device Ma.

Next, in step S03, the power receiving side control device 17 generates a signal for PING transmission by power transmission from the power receiving device 4 to the power transmitting device 2.

Next, in step S04, the power receiving side control device 17 executes PING transmission at a predetermined cycle in the first communication section of the coupling section.

Next, in step S05, the power receiving side control device 17 determines whether a response signal to the PING transmission has been received from the power transmitting device 2. When a result of this determination is "NO," the power receiving side control device 17 repeats processing of step S05. On the other hand, when a result of this determination is "YES," the power receiving side control device 17 advances the processing to step S06.

Then, in step S06, the power receiving side control device 17 executes power reception control for the power transmission from the power transmitting device 2 in the power transmission section. Then, the power receiving side control device 17 advances the processing to an end.

Figure 5:
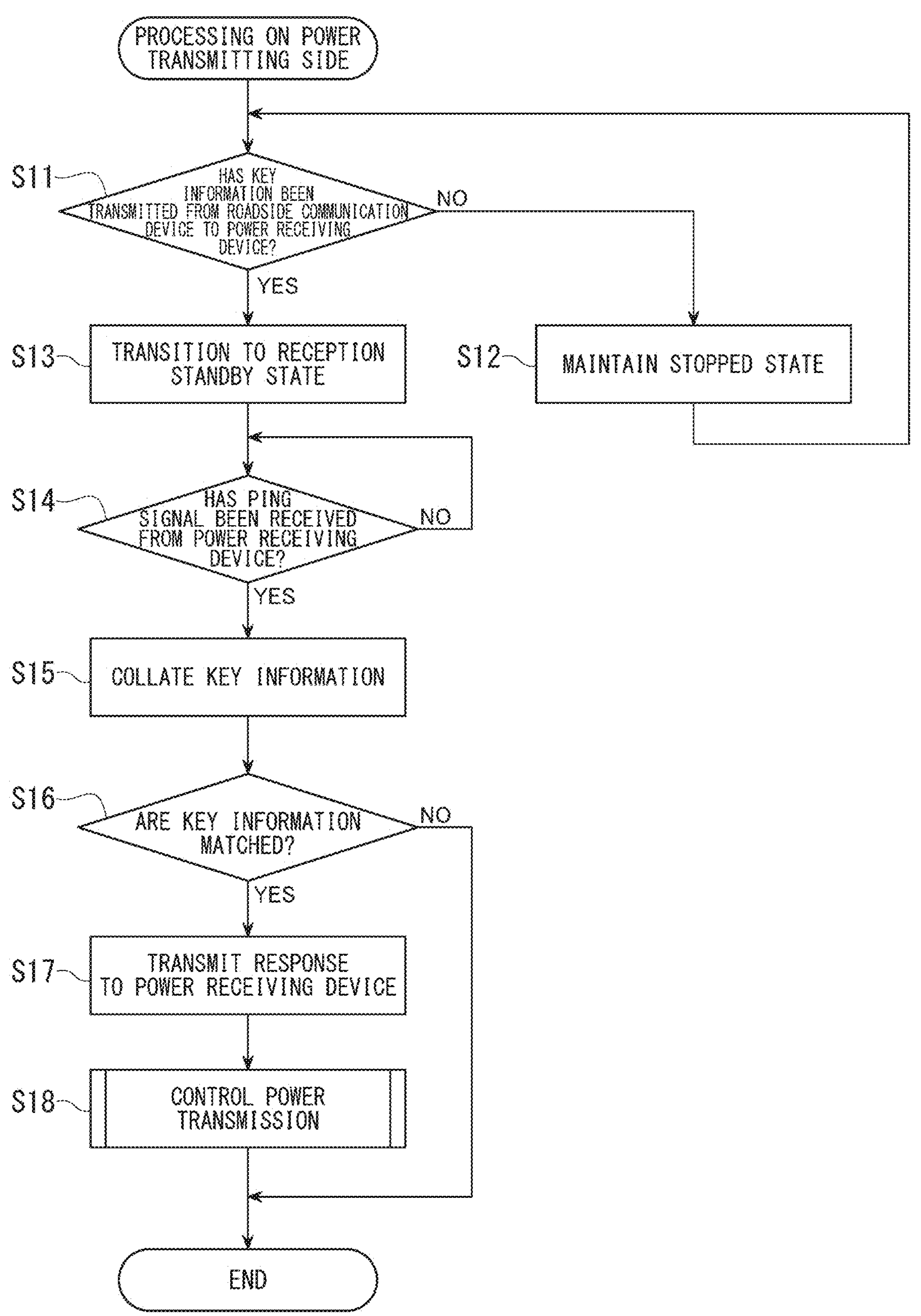
FIG. 5 is a flowchart which shows processing on a power transmitting side of the contactless power transmission system according to the embodiment of the present invention.

FIG. 5 is a flowchart which shows the power transmitting side processing executed by the power transmission side control device 9 of the contactless power transmission system 1 in the embodiment.

First, in step S11 shown in FIG. 5, the power transmission side control device 9 determines whether key information has been transmitted from the roadside communication device Ma to the power receiving device 4. When a result of this determination is "NO," the power transmission side control device 9 advances the processing to step S12. On the other hand, when a result of this determination is "YES," the power transmission side control device 9 advances the processing to step S13.

Then, in step S12, the power transmission side control device 9 maintains a stopped state of the power transmitting device 2, and returns the processing to step S11.

Then, in step S13, the power transmission side control device 9 transitions the power transmitting device 2 from the stopped state to a reception standby state.

Next, in step S14, the power transmission side control device 9 determines whether a PING signal by the power transmission from the power receiving device 4 to the power transmitting device 2 has been received in the first communication section of the coupling section. When a result of this determination is "NO," the power transmission side control device 9 repeats the processing of step S14. On the other hand, when a result of this determination is "YES," the power transmission side control device 9 advances the processing to step S15.

Next, in step S15, the power transmission side control device 9 collates the key information received from the communication control device Mb with the key information received from the power receiving device 4.

Next, in step S16, the power transmission side control device 9 determines whether the key information received from the communication control device Mb matches the key information received from the power receiving device 4. When a result of this determination is "NO," the power transmission side control device 9 advances the processing to an end. On the other hand, when a result of this determination is "YES," the power transmission side control device 9 advances the processing to step S17.

Next, in step S17, the power transmission side control device 9 transmits a response signal to the PING transmission to the power receiving device 4 by the power transmission from the power transmitting device 2 to the power receiving device 4 in the communication section.

Next, in step S18, the power transmission side control device 9 starts power transmission control, described below, in the power transmission section for power transmission to the power receiving device 4 at the requested frequency received from the power receiving device 4. Then, the power receiving side control device 17 advances the processing to the end.

Figure 6:
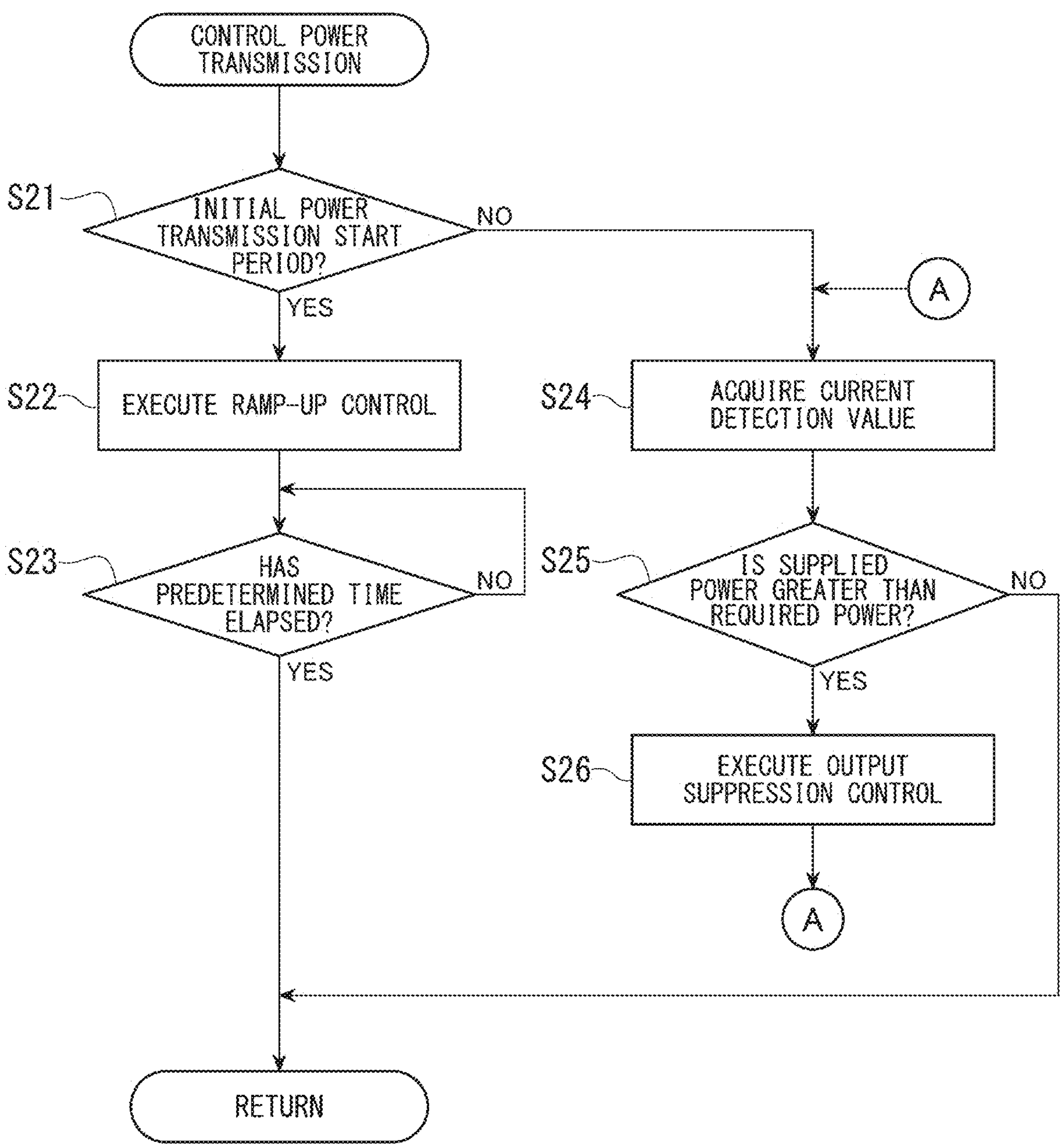
FIG. 6 is a flowchart of the power transmission control shown in FIG. 5.

FIG. 6 is a flowchart of the power transmission control shown in FIG. 5.

First, in step S21 shown in FIG. 6, the power transmission side control device 9 determines whether it is an initial power transmission start period. The initial power transmission start period is, for example, a period of a predetermined time from a start of power transmission. The predetermined time is set on the basis of, for example, at least one of a supply capacity of the power supply unit 6, the number of power transmitting units 8 connected to the power supply unit 6, and a moving speed of the power receiving device 4 relative to the power transmitting units 8 (such as a speed of the moving body). The predetermined time is, for example, between several tens of μs and several ms.

When a result of this determination is "NO," the power transmission side control device 9 advances the processing to step S24. On the other hand, when a result of this determination is "YES," the power transmission side control device 9 advances the processing to step S22.

Next, in step S22, the power transmission side control device 9 executes ramp-up control. In the ramp-up control, the power transmission side control device 9 sets, for example, the transmission power (supplied power) from the power transmitting unit 8 to less than a predetermined power, and changes the transmission power in a tendency of increasing toward the predetermined power as time elapses from a start of power transmission. The predetermined power is, for example, a required power of the power receiving device 4. Next, in step S23, the power transmission side control device 9 determines whether a predetermined time has elapsed since the start of power transmission. When a result of this determination is "NO," the power transmission side control device 9 repeats the determination processing of step S23. On the other hand, when the result of the determination is "YES," that is, when the transmission power is set to the predetermined power as the initial power transmission start period ends, the power transmission side control device 9 returns the processing.

Furthermore, in step S24, the power transmission side control device 9 acquires the detection value of a current (a current of a DC power of the power supply unit 6) detected by the current sensor 6*a*.

Next, in step S25, the power transmission side control device 9 determines whether the transmission power (supplied power) from the power transmitting unit 8 is greater than a predetermined power (for example, the required power of the power receiving device 4) on the basis of, for example, the detection value of a current output from the current sensor 6*a*. When a result of this determination is "NO," the power transmission side control device 9 returns the processing. On the other hand, when the result of this determination is "YES," the power transmission side control device 9 advances the processing to step S26.

Next, in step S26, the power transmission side control device 9 executes output suppression control. Then, the power transmission side control device 9 returns the processing to step S24.

In the output suppression control, the power transmission side control device 9 changes the transmission power from the power transmitting unit 8 in a tendency of decreasing toward a predetermined power by, for example, feedback control based on the detected value of the current output from the current sensor 6*a*.

Figure 7:
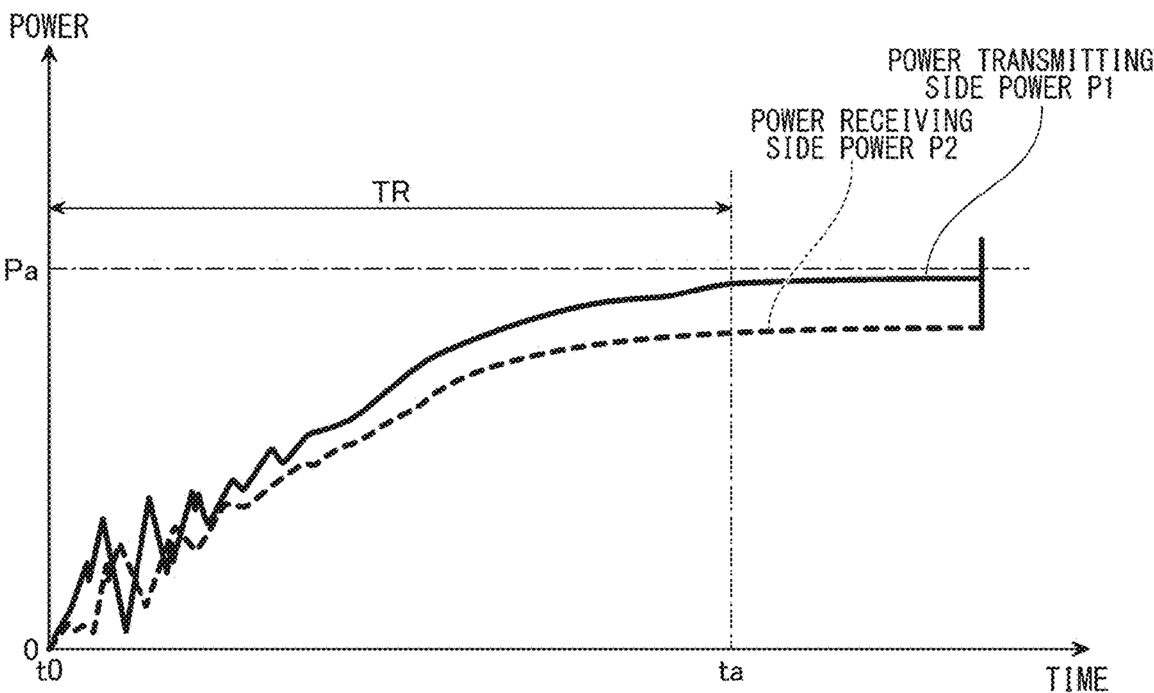
FIG. 7 is a diagram which shows an example of a change over time in power on the power transmitting side and power receiving side of a ramp-up control in the contactless power transmission system according to the embodiment of the present invention.

FIG. 7 is a diagram which shows an example of time changes in a power transmitting side power P1 and a power receiving side power P2 of the ramp-up control in the contactless power transmission system 1 of the embodiment.

As shown in FIG. 7, for example, by executing the ramp-up control over a period of a predetermined time TR from a power transmission start time t0, power transmitted from the power transmitting device 2 (the power transmitting side power P1) and a power received by the power receiving device 4 (the power receiving side power P2) each gradually increase from zero. Each of the powers P1 and P2 changes in a tendency of increasing toward an end time ta of the ramp-up control, and reaches a steady state after the end time ta (for example, a state in which the power transmitting side power P1 reaches the required power Pa of the power receiving device 4). Waveforms of the power P1 and P2 near the power transmission start time to fluctuate due to hunting of a current, but an output is reduced by the ramp-up control, so that generation of excessive power is suppressed.

Figure 8:
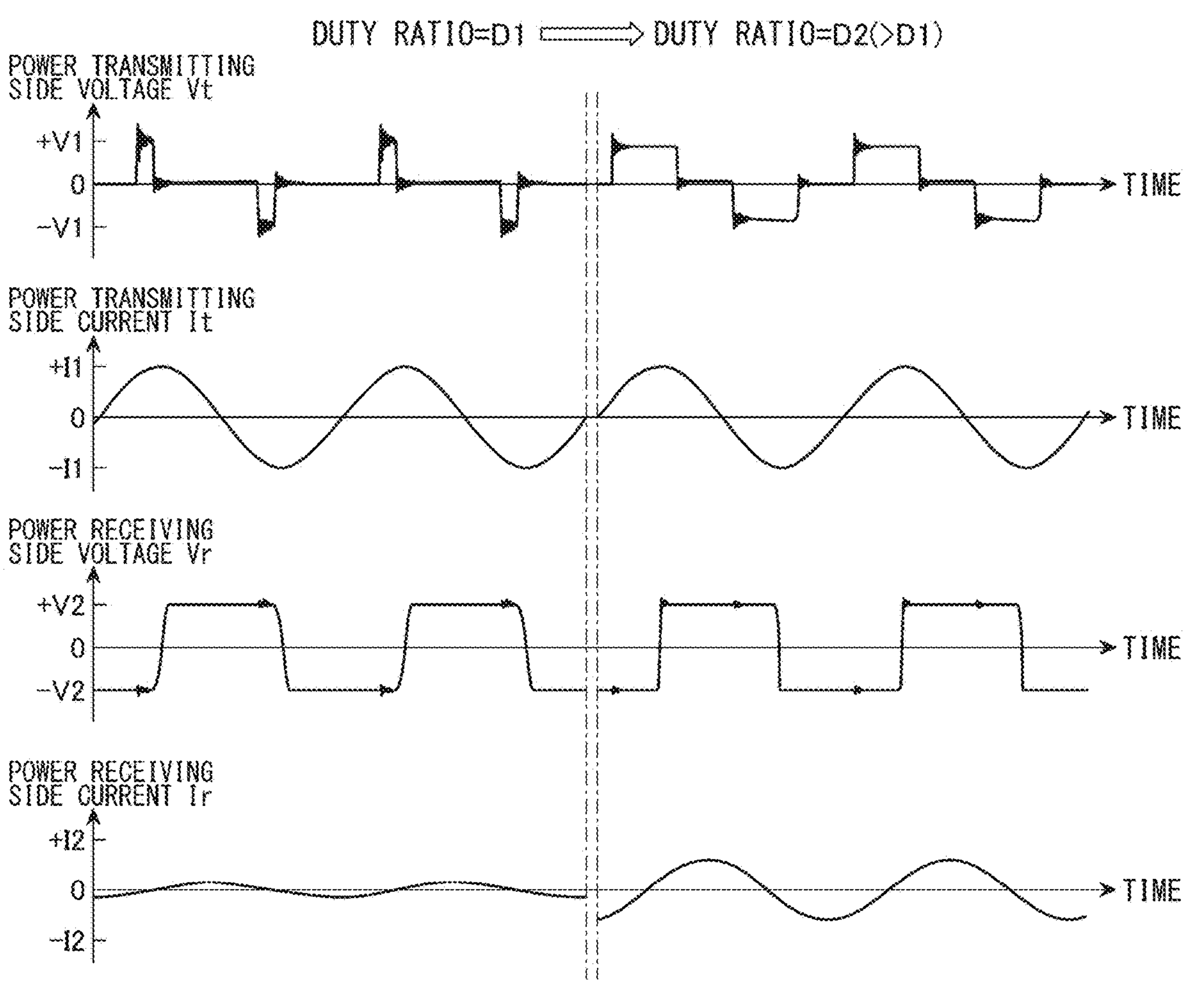
FIG. 8 is a diagram which shows an example of a corresponding relationship between a power transmitting side voltage, a power transmitting side current, a power receiving side voltage, and a power receiving side current under duty ratio control of the ramp-up control in the contactless power transmission system according to the embodiment of the present invention.
Figure 9:
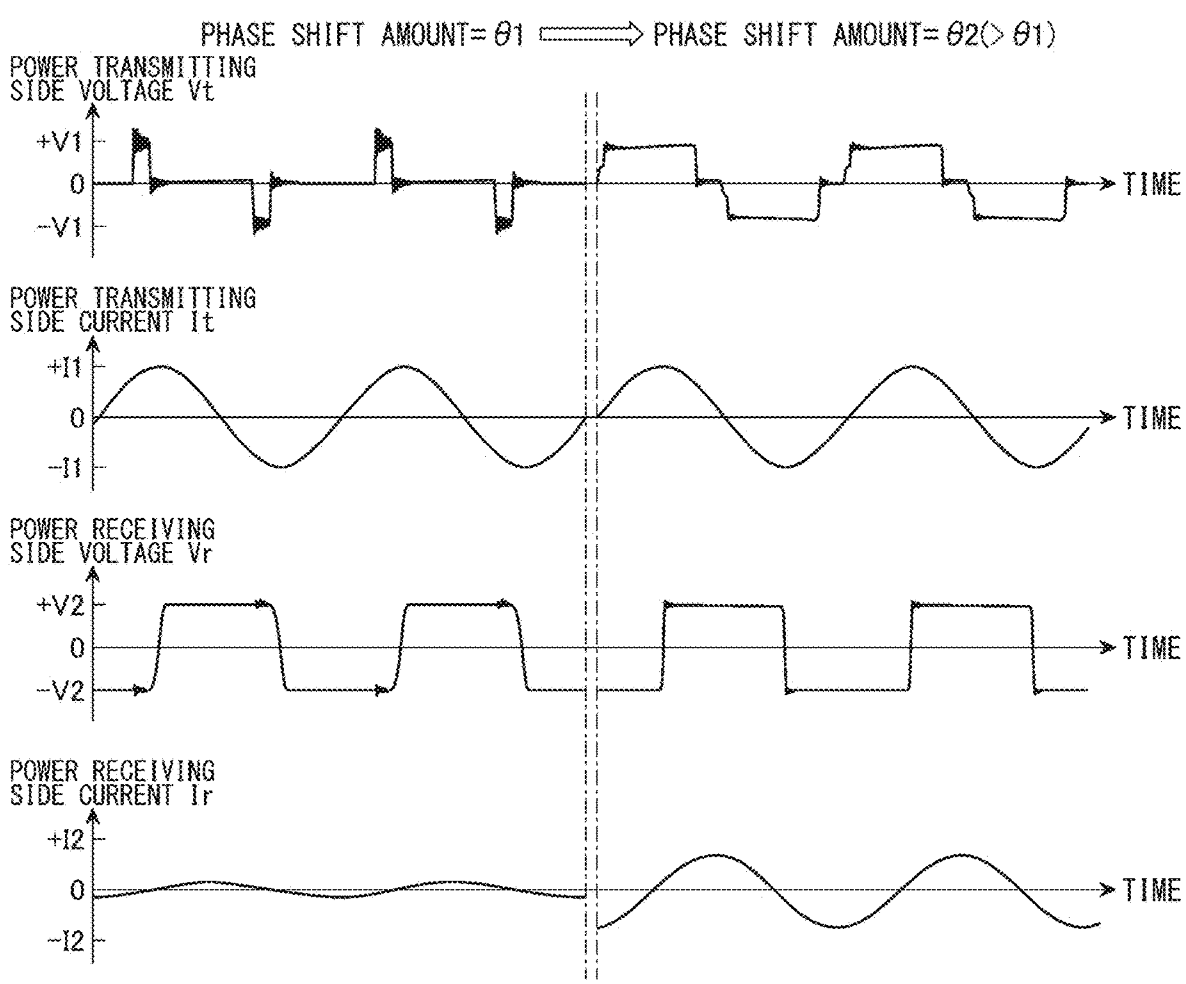
FIG. 9 is a diagram which shows an example of the corresponding relationship between the power transmitting side voltage, the power transmitting side current, the power receiving side voltage, and the power receiving side current under phase shift amount control of the ramp-up control in the contactless power transmission system according to the embodiment of the present invention.

In the ramp-up control, the power transmission side control device 9 controls the transmission power according to, for example, the duty ratio or phase shift amount of a gate signal (a pulse signal) that instructs the switching operation of the power transmission power conversion unit 7. The duty ratio is, for example, a ratio of an ON time of one of the transistors 7*a* and 7*b* that form a pair in each phase of the power transmission power conversion unit 7 (for example, transistor 7*a* of the high side arm) in one cycle of switching control. The phase shift amount is, for example, a phase difference between a gate signal of a first phase and a gate signal of a second phase of two phases of the power transmission power conversion unit 7. FIG. 8 is a diagram which shows an example of the corresponding relationship between a power transmitting side voltage Vt, a power transmitting side current It, a power receiving side voltage Vr, and a power receiving side current Ir in duty ratio control of the ramp-up control in the contactless power transmission system 1 of the embodiment. FIG. 9 is a diagram which shows an example of the corresponding relationship between the power transmitting side voltage Vt, the power transmitting side current It, the power receiving side voltage Vr, and the power receiving side current Ir in the phase shift amount control of the ramp-up control in the contactless power transmission system 1 of the embodiment.

As shown in FIG. 8 and FIG. 9, the power transmission side control device 9 changes the power transmitting side voltage Vt (effective value, or the like) in a tendency of increasing by, for example, gradually or continuously changing the duty ratio or phase shift amount in a tendency of increasing. In the example shown in FIG. 8, the duty ratio is increased from a first duty ratio D1 to a second duty ratio D2 (>D1). In the example shown in FIG. 9, the phase shift amount is increased from a first phase shift amount θ1 to a second phase shift amount θ2 (>θ1). As the duty ratio or the phase shift amount in the switching operation of the power transmission power conversion unit 7 changes in a tendency of increasing, for example, the duty ratio of the switching operation of the power receiving power conversion unit 16 is set to a predetermined constant value (50%, or the like), so that the power receiving side current Ir (effective value, or the like) also changes in a tendency of increasing.

Figure 10:
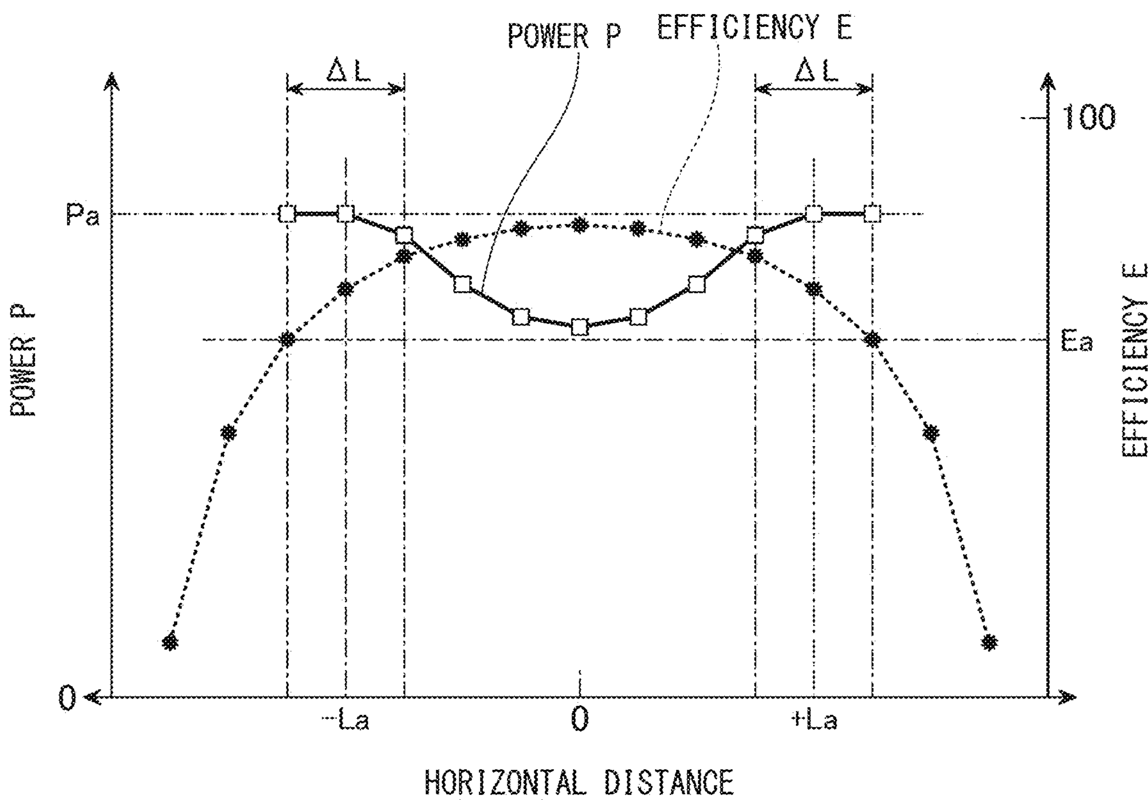
FIG. 10 is a graph which shows an example of a corresponding relationship between power and efficiency according to a horizontal distance (a relative amount of movement between a primary coil and a secondary coil in a direction parallel to a road surface) in the contactless power transmission system according to the embodiment of the present invention.

FIG. 10 is a graph which shows an example of a corresponding relationship between a power (transmission power) P and an efficiency E of the power transmission according to a horizontal distance (a relative amount of movement between the primary coil and the secondary coil in a direction parallel to a road surface) in the contactless power transmission system 1 of the embodiment.

As shown in FIG. 10, for example, in a power transmission section where the efficiency E of the power transmission is equal to or greater than a predetermined efficiency Ea (for example, 80%), ramp-up control is executed in an area with a relatively small degree of coupling (low efficiency), so that the transmission power P is regulated to be equal to or less than the required power Pa. The low efficiency area of the power transmission section is, for example, an area where an absolute value of the horizontal distance is a value within a predetermined range ΔL including the predetermined distance La.

As described above, according to the contactless power transmission system 1 of the embodiment, by providing the power transmission side control device 9 that sets the transmission power in the initial power transmission start period to less than a predetermined power, it is possible to suppress an increase in current that accompanies a rapid start of power supply. The power transmission side control device 9 changes the transmission power to increase toward a predetermined power as time elapses from the start of power transmission, so that an increase in a load on the power supply unit 6 and occurrence of an overcurrent can be suppressed. For example, it is possible to suppress occurrence of problems such as an increase in the load due to a drop in frequency in the power supply system on a power transmitting side and a power supply stop due to overcurrent detection caused by current hunting.

The power transmission side control device 9 sets a period of the initial power transmission start period on the basis of at least one of a supply capacity of the power supply unit 6, the number of power transmitting units 8 connected to the power supply unit 6, and a moving speed of the power receiving device 4 relative to the power transmitting units 8, so that the transmission power can be appropriately reduced.

The power transmission side control device 9 controls the transmission power according to the duty ratio or phase shift amount of a gate signal, so that the transmission power can be quickly controlled even when the power receiving device 4 moves relative to the power transmitting unit 8.

The power transmission side control device 9 controls the transmission power on the basis of a detection value of a current output from the current sensor 6*a* even after the initial power transmission start period has elapsed, so that an appropriate transmission power can be set even when, for example, power transmission is performed sequentially to a plurality of moving bodies such as vehicles with different required powers.

Modified Example

In the embodiment described above, the power transmission side control device 9 executes output suppression control on the basis of the detection value of the current output from the current sensor 6*a*, but the present invention is not limited to this. The power transmission side control device 9 is not limited to the current sensor 6*a*, and may execute output suppression control on the basis of, for example, a detection value of another sensor, such as a current sensor that detects the current (power transmitting side current) It flowing in the resonant circuit of the power transmitting unit 8.

In the embodiment described above, the communication system M constitutes an electronic toll collection system, but the present invention is not limited to this. For example, the communication system M may simply be a system that communicates with the in-vehicle communication device 18 prior to power transmission by the power transmitting device 2 in the power transmission section.

In the embodiment described above, the power transmission between the power transmitting device 2 and the power receiving device 4 transmits and receives key information and information such as the required power and required frequency of the power transmission, but the present invention is not limited to this. For example, the power transmitting device 2 and the power receiving device 4 may each have a communication device for wireless communication with each other, and may transmit and receive information via the mutual communication devices.

In the embodiment described above, the contactless power transmission system 1 may include, for example, a power storage device 11 and a storage voltage conversion unit for converting an input power and an output power of the power storage device 11 in a case of a hybrid vehicle driven by an internal combustion engine as a power source.

The embodiment of the present invention is presented as an example and is not intended to limit a scope of the invention. These embodiments can be implemented in various other forms, and various omissions, substitutions, and modifications can be made within a range not departing from the gist of the invention. These embodiments and their modified examples are included within the scope of the invention and its equivalents as described in the claims, as well as within the scope and gist of the invention.

What is claimed is:

1. A contactless power transmission system comprising:

a power transmitting device comprising:

a power transmitting unit that has a coil for sending out AC power to be transmitted to a power receiving device in a non-contact manner;

a power transmission power converter that has a plurality of switching elements connected to the coil, and converts DC power supplied from a power source to AC power; and a power transmission side control device comprising a processor configured to execute a program that controls a switching operation of the plurality of switching elements, wherein the processor of the power transmission side control device further executes the program to:

set a transmission power in an initial power transmission start period by the power transmitting unit to less than a predetermined power, and change the transmission power in an increasing manner toward the predetermined power as a time elapses from a start of power transmission by the power transmitting unit, wherein the power transmitting device further comprises power transmitting units connected to the power source, wherein the power transmission side control device further executes the program to set the initial power transmission start period to a predetermined period of time from the start of power transmission, and the predetermined period of time is set on the basis of at least one of a supply capacity of the power source, a number of the power transmitting units connected to the power source, and a moving speed of the power receiving device with respect to the power transmitting units.

2. The contactless power transmission system according to claim 1, wherein the power transmission side control device further executes the program to:

control the transmission power according to a duty ratio, or control the transmission power according to a phase shift amount of a signal that instructs the switching operation of the power transmission power converter.

3. The contactless power transmission system according to claim 2, further comprising:

a current sensor configured to detect a current of the DC power, wherein the power transmission side control device further executes the program to:

set the predetermined power as a required power of the power receiving device, and change the transmission power in a decreasing manner toward the predetermined power on the basis of a detection value of a current output from the current sensor when the transmission power is greater than the predetermined power.

* * * * *